United States Patent
Peterson

[11] 3,774,094
[45] Nov. 20, 1973

[54] CONTROL CIRCUIT FOR REGULATING ELECTRIC MOTOR SPEED

[76] Inventor: Donovan F. Peterson, 655 Meadow Ln., Elm Grove, Wis. 53122

[22] Filed: Dec. 21, 1970

[21] Appl. No.: 100,062

Related U.S. Application Data

[63] Continuation-in-part of Ser. No. 880,290, Nov. 26, 1969, abandoned.

[52] U.S. Cl. ............................. 318/331, 318/332
[51] Int. Cl. ........................................... H02p 5/16
[58] Field of Search .................. 318/331, 332, 345, 318/346, 341

[56] References Cited
UNITED STATES PATENTS

| | | | |
|---|---|---|---|
| 3,517,291 | 6/1970 | Carruth | 318/332 |
| 3,250,979 | 5/1966 | Shaw | 318/331 |
| 3,309,596 | 3/1967 | Limley | 318/331 |
| 3,412,306 | 11/1968 | Fischer | 318/331 |
| 3,512,068 | 5/1970 | Mori | 318/331 |

Primary Examiner—Harold Broome
Assistant Examiner—Thomas Langer
Attorney—Andrus, Sceales, Starke & Sawall

[57] ABSTRACT

A control circuit for regulating the speed of a direct current electric motor by intermittent repetitive energization of the motor stator windings. The control circuit is insertable between a direct current power source and the stator windings and is subjectable to a speed responsive self-generated e.m.f. appearing in the windings responsive to the electromagnetic interaction of the magnetic field of the motor armature and the stator windings. The control circuit includes a transistor having the emitter-collector circuit connected between the power source and the motor stator windings and subjected to the self-generated e.m.f. wave appearing in the windings produced by motor rotation. The base of the transistor is connected to a bias circuit for controlling the operation of the transistor responsive to differential voltages applied to the transistor base and emitter terminals. The bias circuit turns the transistor on when the self-generated e.m.f. of the motor is below a predetermined voltage to energize the stator windings from the power source. The bias circuit includes means for altering the voltage applied to the base of the transistor so that when the self-generated e.m.f. attains a second predetermined voltage the transistor is turned off and the supply of power to the stator windings is terminated.

17 Claims, 13 Drawing Figures

CONTROL CIRCUIT FOR REGULATING ELECTRIC MOTOR SPEED

CROSS REFERENCE TO RELATED APPLICATION

The present application is a continuation-in-part application of copending application Ser. No. 880,290, filed Nov. 26, 1969, and now abandoned.

BACKGROUND OF THE INVENTION

1. Field of the Invention

The present invention relates to electric motive power systems and more particularly to a running speed control circuit.

2. Description of the Prior Art

The present invention is directed to a control circuit for regulating the speed of a direct current motor and is particularly suited for maintaining the speed of the motor constant within prescribed limits, thereby to act as a governor of the motor speed.

The speed governing characteristic of the control circuit of the present invention permits its use in applications requiring the speed of the motor to be made constant irrespective of the motor load, up to a predetermined torque limitation. The control circuit of the present invention is particularly useful in instances in which the direct current motor is powered by a battery power supply and in which it is desired to render the speed of the motor independent of battery voltage so as to maintain the constant speed characteristics of the motor throughout the service life of the battery. A typical, although by no means exclusive, application calling for the above requirements in the use of a direct current motor in a battery operated, motor driven timing device.

Typical motor speed governing devices presently in use usually include mechanical apparatus which is responsive to the motor speed. The mechanical apparatus opens and closes contacts to control the supply of electrical power to the motor thereby regulating motor speed. However, it will be readily appreciated that the use of such mechanical apparatus leaves much to be desired in terms of system response time, physical size, closeness of speed regulation, service life and maintenance, and other important design and operating criteria.

SUMMARY OF THE PRESENT INVENTION

It is the object of the present invention to provide a control circuit which governs the speed of a direct current motor so as to make that speed independent of the applied load and voltage. Stated conversely, the control circuit maintains the speed of the motor constant in the face of variations of load and voltage.

It is a further object of the present invention to provide a motor speed governing control circuit which eliminates the necessity for incorporating mechanical speed responsive apparatus in the circuit in order to provide speed regulation for the motor.

To provide the aforesaid advantages and features, the control circuit of the present invention is insertable between a direct current power supply and the motor for providing the motor with electric pulses of sufficient duration to maintain the speed of the motor at the desired constant level. The provision of these pulses and their duration is controlled by the operative condition of the motor as reflected in its self-generated or counter e.m.f., thereby eliminating the need for additional apparatus and complicated pulse-width modulators commonly found in prior art speed controls.

In addition to providing constant motor speed operation, regardless of applied load and voltage, the control circuit of the present invention controls the acceleration of the motor to the desired constant speed level in a manner such as to prevent overshoot or oscillatory instability, thereby to assist in achieving constant speed operation.

It is a further object of the present invention to provide a control circuit which permits the output torque of the motor to be increased, while at the same time maintaining constant motor speed operation.

The control circuit of the present invention may be effectively used with direct current motors having a large ripple in the self-generated e.m.f.

The circuitry required to carry out the speed governing operation of the control circuit of the present invention is simple in design and construction, incorporating only direct coupled circuit elements. The control circuit of the present invention provides reliable operation for substantial periods of time and stable, highly responsive, speed governing action over a wide temperature range and without oscillatory or other instabilities.

The control circuit of the present invention provides the direct current motor speed regulating action by self-controlled intermittent, repetitive energization of the motor windings. The control circuit is insertable between a direct current power source and the motor windings and is subjectable to the self-generated or counter e.m.f. generated in the windings. The self-generated or counter e.m.f. is directly proportional in magnitude to the speed of the motor rotor.

The control circuit comprises several feedback systems making up the power and reference bias controls which are subject to the motor's dynamic electrical and mechanical response characteristics to achieve pulse width operation automatically for the purpose of maintaining motor speed.

The control circuit includes a current control device having a power circuit connectable between the direct current power source and the motor windings and subjectable to the self-generated e.m.f. appearing in the windings. The current control device is responsive to differential voltages applied to the power control elements of the current control device.

A reference bias circuit is coupled to the current control device for applying a reference bias voltage to place the power circuit in the operative state when the self-generated e.m.f. is less than or decreases to a predetermined voltage. With the current control device in the operative state, the motor windings are powered from the direct current power source. The reference bias circuit removes the current control device from the operative state when the counter e.m.f. appearing in the powered windings attains a predetermined voltage, thereby to de-energize the motor windings and terminate the power supply pulse.

An amplification means may be inserted between the control circuit and the motor winding to decrease the power passing through the control circuit.

The present invention also contemplates a method of regulating the speed of a direct current motor by the intermittent application of power pulses to the motor windings.

BRIEF DESCRIPTION OF THE DRAWING

FIGS. 6 through 9 also show the speed regulating method of the present invention.

DESCRIPTION OF THE PREFERRED EMBODIMENT

The Motor

The control circuit of the present invention is designed for use with direct current motor 10. Motor 10 is illustratively shown and described herein as having a plurality of commutator controlled, stationary coils and a bipolar permanent magnet rotor. In operation, the commutated coils produce a rotating electromagnetic field with which the permanent magnet rotor interacts and is thereby revolved. However, motor 10 may be constructed with commutator controlled, rotating coils as an armature which produce a stationary electromagnetic field for interaction with the stationary permanent magnet field. The term "energizing coils" or "windings" may be used in the present specification and claims to describe the aforesaid coils without regard to whether they are stationary or rotating. Additionally, it will be understood that electro-magnets may be substituted for the permanent magnets found in such motors and described herein.

Motor 10 includes a shaft 12 which is rotated by the electromagnetic forces generated in motor 10 when energized from battery 15 through control circuit 100 of the present invention. A rotor 14, consisting of a bipolar bar magnet having a pole 16 and an opposite pole 18, is mounted on shaft 12 so that the axis of the poles is perpendicular to the axis of rotation of shaft 12. The axis of the poles generates a plane perpendicular to the shaft 12 as rotor 14 roates.

A commutator 20 is mounted on one end of shaft 12. Commutator 20 may consist of a drum, the axis of which is coaxial with the axis of rotation of shaft 12. A pattern of electrically conductive and non-conductive areas is placed on the drum 20 to control the energization of the stator as the rotor rotates, in a manner hreinafter described.

The stator of motor 10 comprises three bobbin wound windings, 22, 24 and 26. Each of the windings is wound on a spool 28 of generally rectangular construction and having a rectangular opening 30 in the center. The wire forming the stator windings is wound around the spool in reel-like fashion and the two ends of the coil-forming wire are extracted for connection purposes hereinafter described.

The three windings are arranged on the frame of the motor, (not shown) in essentially a closed equilateral triangular configuration, with each winding occupying one side of the configuration. The plane of the triangular configuration lies perpendicular to the axis of rotation of shaft 12 but is co-planar with the plane of rotation of the polar axis of rotor 14. When the motor is assembled, the poles of rotor 14 are periodically inserted in rectangular openings 30 of spools 28 as rotor 14 rotates.

The stator windings 22, 24, and 26 are electrically connected in the following manner. One end of each of the windings is connected to a common junction 32. The other end of each of the windings is connected to a commutator brush which cooperates with commutator drum 20 to provide electrical energization to the windings in accordance with the pattern of electrically conductive areas on drum 20 as the commutator drum rotates.

Figures 2, 3A:
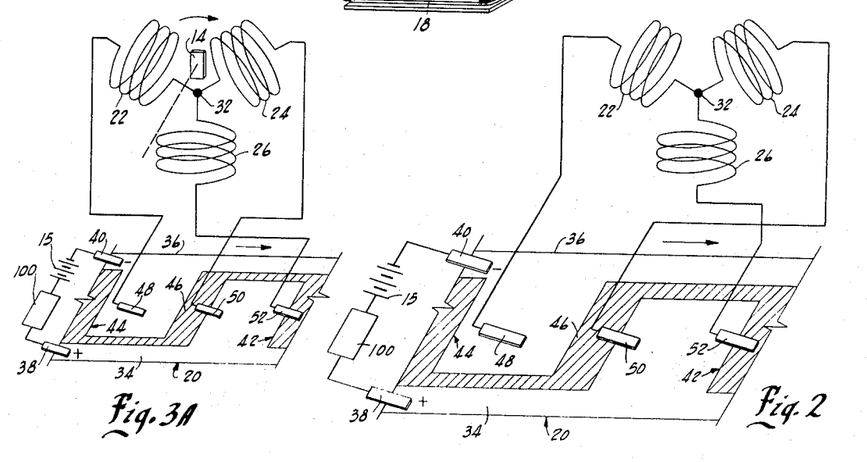
FIG. 2 is a schematic diagram of portions of the motor shown in FIG. 1 and showing the connection of the stator windings of the motor. The figure also shows the circumferential surface of the drum commutator shown in FIG. 1 in developed, planar form.
FIGS. 3a through 3d are schematic diagrams showing the operation of the motor shown in FIGS. 1 and 2.

The pattern of electrically conductive areas on commutator drum 20 is shown in FIG. 2, which figure shows the circumferential surface of drum 20 in planar form. A positive electrically conductive bus 34 lies along one edge of the surface of the drum while a negative electrical bus 36 lies along the other edge of the surface. Brush 38, connected to the positive terminal of battery 15 through control circuit 100, contacts positive bus 34 while brush 40 connected to the negative terminal of battery 15 contacts negative electrical bus 36. Brushes 38 and 40 retain contact with buses 34 and 36 for all rotary positions of commutator drum 20 and rotor 14.

A rectangular positive commutator segment 42 extends from positive bus 34 for a portion of the length of the latter. A similarly shaped negative commutator segment 44 extends from negative bus 36 for a portion of the length of the negative bus. The commutator segments are separated by a non-conductive insulating area 46 which lies between the segments and the buses.

The commutator brushes connected to one end of windings 22, 24 and 26 are positioned so as to contact commutator segments 42 and 44 as commutator drum 20 rotates. Specifically, commutator brush 48 is connected to one end of winding 22, commutator brush 50 is connected to one end of winding 24, and commutator brush 52 is connected to one end of winding 26. Commutator brushes 48, 50 and 52 serve to selectively energize stator windings 22, 24 and 26 as commutator drum 20 rotates.

The operation of motor 10 without regard to the speed regulating action of control circuit 100 may be seen by reference to FIGS. 3a through 3d which, in diagrammatic form, show various mechanical and electrical phenomena occurring in motor 10.

Figure 1:
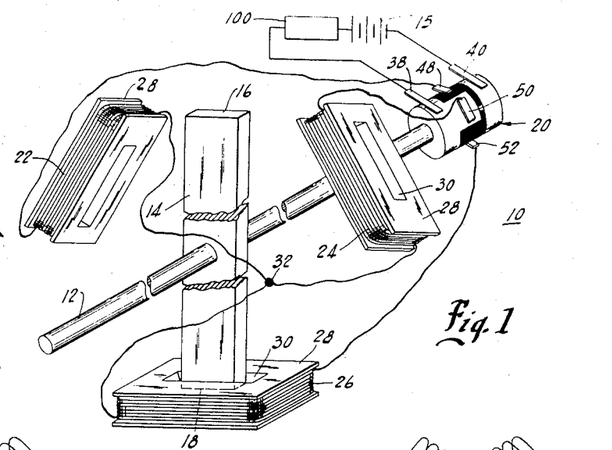
FIG. 1 is an exploded view of a motor with which the control circuit of the present invention may be used.

Battery 15 is connected to brushes 38 and 40 which energize positive and negative buses 34 and 36 on commutator drum 20. In the present analysis, the operation of motor 10 will be explained starting with the rotor in the vertical position shown in FIGS. 1 and 3a. With the rotor in such a position, commutator drum is located such that commutator brush 48 is in contact with negative commutator segment 44 to supply negative voltage from battery 15, brush 40, negative bus 36, to one end of winding 22. The negative voltage provides an electron current which flows through winding 22 to common junction 32.

Commutator drum 20 is also located so that commutator brush 50 is in contact with positive commutator segment 42, supplying a positive voltage to the end of winding 24. The electron current from common junction 32 thus flows through winding 24, commutator brush 50, positive commutator segment 42, positive bus 34, brush 38 to battery 15. Commutator brush 52 is located on non-conductive area 46 so that winding 26 is deenergized.

Figure 3B:
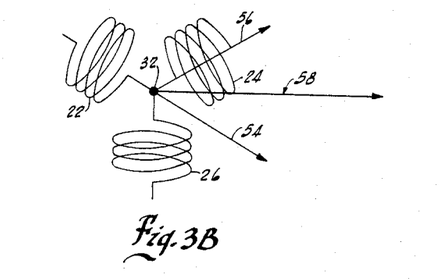

The resulting magnetic field effect created by the above energization of windings 22 and 24 may be assumed as shown in diagrammatic vector form in FIG. 3b. In accordance with Fleming's rule, the current flow in winding 22 from commutator brush 48 creates a magnetic field, the polar axis 54 of which lies along the center of the coil. The polarity of the magnetic field may be assumed to be as shown in FIG. 3b. The current flow in winding 24 is opposite to the current flow in winding 32 in that it flows from common junction 32 back to commutator brush 50. This current flow also creates a magnetic field, the axis 56 of which lies along the center of the coil. As the direction of current flow through the coil is opposite, the polarity of the magnetic field is also opposite, as shown in FIG. 3b.

A resulting magnetic field is created in the stator by the vector summation of the magnetic fields having axes 54 and 56. The axis of the resultant magnetic field produced by this vector summation is shown in FIG. 3b by the numeral 58. As will be noted, this magnetic field is perpendicular to the polar axis of rotor 14 when the rotor is positioned as shown in FIG. 3a. The interaction of the magnetic field produced by windings 22 and 24 and magnetic poles 16 and 18 of rotor 14 provides attraction and repulsion forces which urge the rotor poles into alignment with the polar axis 58 of the stator windings, thus causing rotation of rotor 14.

Figure 3C:
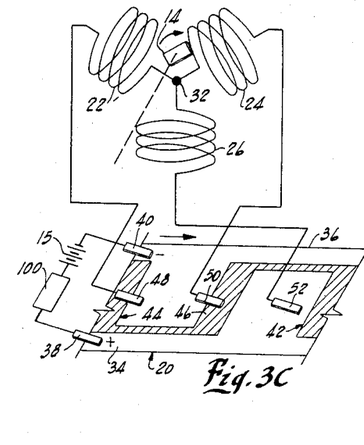

As rotor 14 turns, in the direction of the arrow shown in FIG. 3a, commutator drum 20 also rotates, moving positive and negative commutator segments 42 and 44 to a new position. When rotor 14 has rotated 60°, the commutator drum is positioned as shown in FIG. 3c. Commutator brush 48 remains in contact with negative commutator segment 44 to supply negative voltage from battery 15, brush 40, and bus 36 to one end of winding 22. The current flows to common junction 32. Due to the movement of commutator drum 20, commutator brush 52 is now in contact with positive commutator segment 42 to supply positive voltage to the end of winding 26 and to provide a current return path to battery 15 for the current in winding 22. Commutator brush 50 is in contact with non-conductive segment 46, deenergizing winding 24.

Figure 3D:
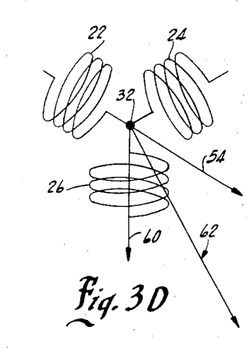

The magnetic fields created by the above described energization of stator windings 22 and 26 are shown in vector axes form in FIG. 3d. Winding 22 continues to create the magnetic field 54 which lies along the center of the winding. However, as commutator brush 52 is in contact with positive commutator segment 42, a magnetic field is now generated by winding 26. The current flow in winding 26 is in the opposite direction from the current flow in winding 22 so that the polarity of the magnetic field is opposite, as shown by axis 60. The resultant magnetic field 62 is of a polarity and location to urge the continued rotation of rotor 14.

As rotor 14 continues to turn, additional resultant magnetic fields are created which further urge the continued rotation of rotor 14. It will be appreciated that the three commutator brushes and two commutator segments provide six resultant magnetic fields for each revolution of rotor 14. During each revolution there also exists six commutation positions in which all three commutator brushes are simultaneously in contact with commutator segments 42 and 44. In these positions, one coil is connected in series with the other two coils in parallel.

Turning now to a consideration of motor 10 in which rotor 14 is rotating but stator windings 22, 24 and 26 are disconnected frm power source 15, as the rotor rotates it generates or induces an electromotive force in stator windings 22, 24 and 26 due to the passage of the magnetic field of the poles of the rotor through the coils of the stator windings. The magnitude of this induced or self-generated e.m.f. at any given moment depends in part on the rate of change of the magnetic flux of the rotor magnetic field, which in turn depends on the speed of the rotor. The magnitude of the self-generated e.m.f. is also a function of the number of coil turns being intercepted or cut by the flux which depends on the position of the rotor with respect to the stator winding coils.

Figure 6:
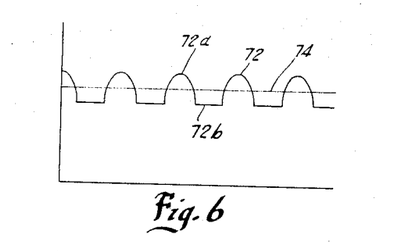
FIG. 6 is a graph showing the wave form of the self-generated e.m.f. of the motor of FIGS. 1 through 3 and the establishment of a reference bias voltage level in the control circuit of the present invention.

The self-generated e.m.f. generated by rotor 14 of motor 10 described herein is an undulating wave which is conducted by commutator brushes 48, 50 and 52 and commutator segments 42 and 44 to brushes 38 and 40. FIG. 6 shows the self-generated e.m.f. 72 appearing at the motor terminals, for example, brushes 38 and 40 assuming brush 40 at zero potential. Six ripples are produced during each complete revolution of rotor 14.

The undulations in the self-generated e.m.f. are caused by the varying rates of change in the flux as the rotor rotates. When a pole of rotor 14 passes beneath a junction or intersection of two adjoining coils forming windings 22, 24 or 26, a peak e.m.f. 72a is induced because of the high rate of change of the flux, the proximity of a rotor pole to the conductors and number of conductors cut by the flux. When the rotor is in the commutation position, the rate of change of the flux is relatively constant generating a lower, nearly constant e.m.f. 72b which forms the valley or trough of the self-induced e.m.f. wave.

The overall voltage level of self-generated e.m.f. 72 is dependent on the speed of rotor 14. The faster the speed of rotor 14, the greater the rate of change of the flux and the higher the voltage of self-generated e.m.f. 72.

When stator windings 22, 24 and 26 are energized from power source 15, self-generated e.m.f. 72 opposes the applied voltage of battery 15 and thus becomes a counter e.m.f.

The Control Circuit

Figure 4:
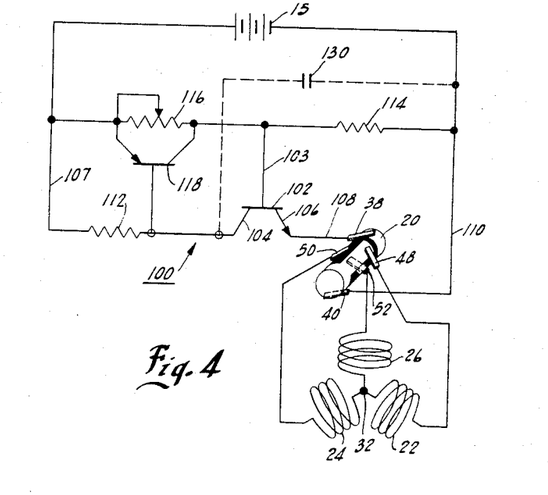
FIG. 4, a schematic diagram of one embodiment of the present invention, shows a control circuit for establishing and maintaining the speed of the motor independent of motor load.
Figure 5:
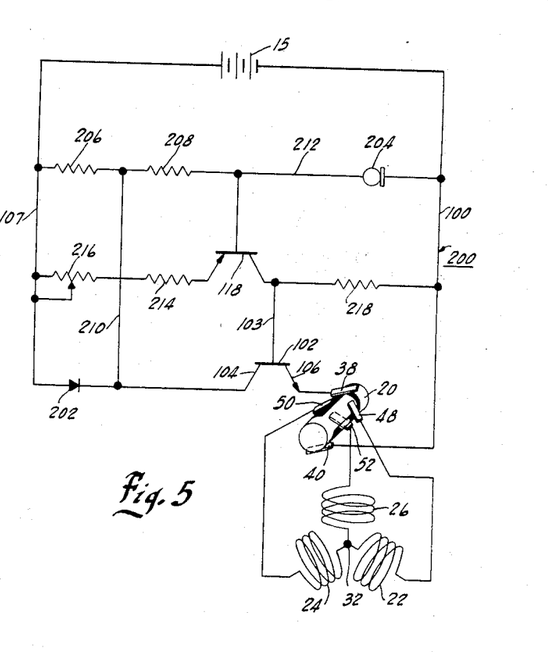
FIG. 5 is a schematic diagram of another embodiment of the control circuit of the present invention for establishing and maintaining motor speed independent of motor load and power supply voltage.

The control circuit of the present invention is shown in FIGS. 4 and 5. FIG. 4 shows a control circuit which governs the speed of the motor so as to make the speed independent of the load applied to motor 10 while FIG. 5 shows a control circuit which so governs the speed of motor 10 as to make it independent of both the load applied to motor 10 and variations in the voltage of battery 15.

Turning now to FIG. 4, similar numerals identify similar components found in that figure and in the proceding figures. Control circuit 100 is interposed between battery 15 and brushes 38 and 40 which selectively connect the battery to stator windings 22, 24 and 26. Control circuit 100 includes a current control device 102, which may be an NPN transistor having its collector 104 connected through transistor 118 with its emitter-base shunting resistor 112 to conductor 107 and to the positive terminal of battery 15. The emitter 106 of transistor 102 is connected by conductor 108 to brush 38. The emitter 106 of transistor 102 thus receives the self-generated or counter e.m.f. of the stator windings 22, 24 and 26 existing at brush 38. Brush 40 is connected to the negative terminal of battery 15 by conductor 110 to complete the power circuit.

A reference bias circuit is connected to base 103 of transistor 102 to control the operative state of the emitter-collector circuit. The bias circuit includes a voltage divider composed of resistor 114 and rheostat 116 connected in series between conductors 107 and 110. Transistor 118 which may be of the PNP type, has the emitter-collector terminals connected in parallel with rheostat 116 while the base of transistor 118 is connected to the end of resistor 112 and to collector 104 of transistor 102.

In analyzing the operation of control circuit 100, it may be initially assumed that rotor 14 is rotating but stator windings 22, 24 and 26 are deenergized. Under such conditions, brush 38 provides self-generated e.m.f. 72 to emitter terminal 106 of transistor 102. As noted supra, this self-induced e.m.f. increases as the speed of rotor 14 increases and decreases as the speed of the rotor decreases. The voltage divider 114, 116 provides a reference bias voltage 74, as shown in FIG. 6, to base 103 of transistor 102 so that a voltage differential is established across the emitter-base junction of transistor 102 and between emitter 106 and base 103. In order for transistor 102 to be placed in the conductive state, the emitter terminal 106 must be more negative than base terminal 103 by a predetermined voltage termed the forward voltage drop which is determined by the characteristics of the semi-conductor material of transistor 102. The magnitude of reference bias voltage 74 provided by voltage divider 114–116 is such that with rotor 14 rotating at the desired speed, the self-generated e.m.f. generated by the rotor and applied to emitter 106 is never sufficiently negative with respect to voltage 74 applied to base 103 in turn transistor 102 on, even at the reduced portions 72b of the valleys of self-generated e.m.f. wave 72. Thus, under conditions in which the rotor 14 continuously rotates at the desired speed, due to the inertia of the rotating parts, or for other reasons, transistor 102 is not turned on and no power is supplied from battery 15 to stator windings 22, 24 and 26.

Figure 7:
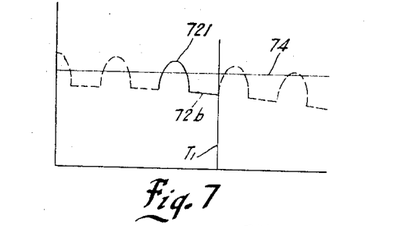
FIG. 7 is a graph, similar to FIG. 6, showing the operating conditions necessary for initiating the operation of the control circuit of the present invention.

However, when rotor 14 starts to decrease in speed, self-generated e.m.f. 72, including the more negative voltage portions 72b, starts to decrease in magnitude. This decreasing self-generated e.m.f. 72 is shown in exaggerated scale in FIG. 7 by the graph 721. In FIG. 7 it is assumed for exemplary purposes that a number of ripples of decreasing magnitude shown by dotted lines have preceded the ripple 721 whereas in actuality this would not occur due to the sensitivity of control circuit 100. Eventually, as the speed of rotor 14 decreases, the more negative voltage portions 72b of self-generated e.m.f. 72 similarly decrease to a point at which the self-generated e.m.f. applied to emitter 106 of transistor 102 will be sufficiently negative, with respect of voltage 74 on base terminal 103 to place transistor 102 in the conductive state. This may occur at time $T_1$, in FIG. 7.

With transistor 102 in the conductive state, the emitter-collector circuit assumes a high conductance state and allows current to begin to flow from battery 15 to motor 10, energizing the appropriate stator windings 22, 24 and 26 to generate the magnetic fields necessary to accelerate rotor 14 back to the desired speed.

Figure 8:
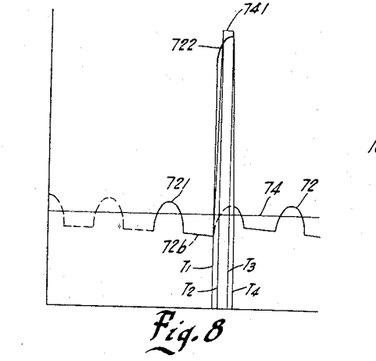
FIG. 8 is a graph, similar to FIG. 6, showing the operation of the control circuit of the present invention.

The current flowing through motor stator windings 22, 24 and 26 and the emitter-collector circuit of transistor 102 also flows through resistor 112. The voltage developed across resistor 112, when applied to the base of transistor 118, turns that transistor on, placing the emitter-collector circuit in a high conductance condition and shorting out rheostat 116. With rheostat 116 shorted out, the operation of voltage divider 114, 116 is substantially altered so that an increased voltage 741 is applied to the base 103 of transistor 102. While the operation of transistors 102 and 118 is a regenerative process, that is, further increases in current flow through transistor 102 causes resistor 112 to further turn on transistor 118 which increases the voltage applied to the base of transistor 102 to cause the latter transistor to conduct more, and thus takes a finite time, $T_1$ to $T_2$, as shown in exaggerated form in FIG. 8, as a practical matter the increase of the voltage on base terminal 103 from voltage 74 to voltage 741 occurs instantaneously, The voltage 722 across the motor windings appears on emitter 106 of transistor 102 and follows the reference bias voltage 741 through the emitter follower action of transistor 102. The level of reference bias voltage 741 applied to base 103 of resistor 102 is selected by the choice of transistor 114 and rheostat 116 to be such as to maintain the transistor 102 in the conductive state when the increased voltage 722 is applied to emitter 106.

Figure 9:
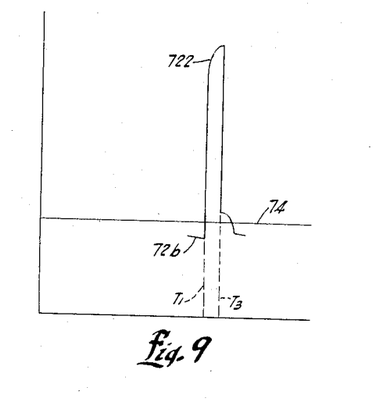
FIG. 9 is a graph showing the supply of power from the control circuit of the present invention to the motor.

As rotor 14 is accelerating due to the energization of the stator windings 22, 24 and 26, the counter e.m.f. voltage 722 is rising because of the increasing speed of rotor 14. When the speed of rotor 14 regains the predetermined desired level, the counter e.m.f. voltage 722 will have reduced the current in motor 10 and resistor 112 to a level such that the voltage drop across resistor 112 decreases the drive on the base of transistor 118 causing the reference bias voltage boost 741 to decrease thereby causing the difference between voltage 722 and voltage 741 to be less than the forward base-emitter voltage drop of transistor 102. This turns transistor 102 off at time $T_3$, stopping the supply of power from battery 15 to windings 22, 24 and 26 as the speed of motor 10 has returned to the desired speed level. Voltage 722 again becomes self-generated e.m.f. returning to the level indicated by the numeral 72. The pulse of power supplied to motor 10 from battery 15 by the operation of control circuit 100 is shown in FIG. 9.

The counter e.m.f. increase reduces the current flow through motor 10 and resistor 112 which turns off transistors 118 and 102 by a regenerative circuit action similar to that by which they were turned on. This reinserts rheostat 116 in voltage divider 114, 116 at time $T_4$ and restores the reference bias voltage on base terminal 103 to the level of voltage 74. This prepares control circuit 100 for a subsequent operation when the speed of motor 10 again slows slightly from the desired constant speed level.

The turn on and the turn off of transistor 102 is controlled solely by the operative condition and response of motor 10. While the operation of control circuit 100 has been described above in a case in which the load on the motor permits it to resume the desired speed level within the relatively short time interval $T_1$ to $T_3$, it will be appreciated that a heavy load on motor 10 may slow the resumption of the motor 10 to the desired speed level so that not until the second, third, or later peak ripple 721 after $T_1$ will transistor 102 be turned off. If the motor load exceeds the torque limit of motor 10, transistor 102 will be continuously on, indicating that constant speed operation of the motor has been lost because of the excessive load.

Due to the fact that the turn on and turn off of transistor 102 is controlled by the self-generated or counter e.m.f. of motor 10 and because control circuit 100 contains no elements which would introduce time constants into the operation, the acceleration of motor 10 to the desired speed level occurs without overshoot or oscillatory instability.

As will be appreciated, the reference bias provided by voltage divider 112, 114, 116 to base 103 of transistor 102 will vary in accordance with variations in the voltage of battery 15 since the current through the resistors and the voltage drops across them are directly proportional to the battery voltage. Thus, as the voltage of battery 14 begins to drop during the service life of the battery, the bias applied to the base terminal of transistor 102 also drops. This causes a reduction in the speed of rotor 14 since the speed of rotor 14 must be less to provide the necessary base-emitter voltage drop across transistor 102 required to turn the transistor on and to energize stator windings 22, 24 and 26 to restore the speed of rotor 14 to the desired level.

In many cases, the slight drop in speed of motor 10 as battery 15 is used is a minor consideration and does not outweigh the features of simplicity and economy attendant the circuitry shown in FIG. 4. In other cases, it is desirable to maintain constant speed operation of motor 10 over the entire service life of battery 15. FIG. 5 shows a control circuit 200 capable of providing such operation at the expense of but a slight increase in the cost of the circuitry. Control circuit 200 provides such operation by the inclusion of a means to maintain the reference bias voltage level established in the circuit independent of the variations in the voltage of battery 15, so that the operation of the circuit is unaffected by such variations.

Contro circuit 200 includes an NPN transistor 102 having the emitter-collector circuitry connected in series with battery 15 and commutated stator windings 22, 24 and 26. Diode 202 shunted by resistor 206 is connected in series with the collector 104 of transistor 102 and battery 15 for a purpose hereinafter described.

The reference bias circuitry of control circuit 200 includes a current regulating diode 204 connected in series with resistor 206 with shunting diode 202 and resistor 208 across battery 15. A current regulating diode is usually a semi-conductor field effect device which provides a current which is essentially independent on the applied voltage of battery 15. When used in control circuit 200, current regulator diode 204 provides a constant current through resistor 206 with shunting diode 202 and resistor 208 irrespective of the voltage of battery 15 thereby to establish the voltage drops of resistor 206 with shunting diode 202 and resistor 208 which is independent of the battery voltage. Resistor 206 is shunted by conventional diode 202 by means of conductor 210.

The series resistor 206 with shunting diode 202 and resistor 208 and current regulator diode 204 form input circuitry for PNP transistor 118. Specifically, the base of transistor 118 is connected to conductor 212 extending between current regulator diode 204 and resistor 208. The emitter of transistor 118 is connected through series connected resistor 214 and rheostat 216 to conductor 107. The collector of transistor 118 is connected to base 103 of transistor 102. The base of transistor 102 and the collector of transistor 118 are connected to conductor 110 through resistor 218.

In operation, the turn-on functioning of control circuit 200 is the same as control circuit 100. That is, as the self-generated e.m.f. in the commutated stator windings 22, 24 and 26 decreases as the speed of rotor 14 decreases, the forward voltage drop across the base and emitter terminals of transistor 102 attains a value sufficient to bias transistor 102 on, closing the emitter-collector circuit of the transistor and supplying power from battery 14 to stator windings 22, 24 and 26 through brush 38.

The reference bias voltage applied to base 103 of transistor 102 is maintained at a constant level despite variations in the voltage of battery 15 by the operation of current regulating diode 204. An unvarying base voltage excitation is thus produced for transistor 118 which, by its emitter follower feedback action, causes resistor 218 to provide the desired constant reference bias voltage on base 103 of transistor 102.

With transistor 102 in the conductive state, stator windings 22, 24 and 26 are energized to commence the acceleration of rotor 14 back to the desired speed.

The current flowing in the emitter-collector circuit of transistor 102 causes a voltage drop across resistor 206 and diode 202 connected in shunt therewith. This voltage drop increases the base voltage applied to transistor 118 which by emitter follower feed-back action increases collector-emitter current through resistor 218 thereby increasing the reference bias voltage applied to base 103 of transistor 102. The increase in the reference bias voltage occurs in the regenerative manner described in connection with the circuit of FIG. 4 and shown in FIG. 8. The amount by which the reference bias voltage is increased is determined by the voltage drop across resistor 206 limited by the forward voltage drop of diode 202 and by the feed-back controlled gain of transistor 118.

When the speed of rotor 14 regains the desired level, transistor 102 is turned off by the counter e.m.f. of motor 10 in the same manner as described in connection with control circuit 100 shown in FIG. 4, terminating the supply of power to windings 22, 24 and 26. Transistor 102 is turned back on as soon as the speed of rotor 14 and the self-generated e.m.f. of motor 10 appearing at emitter 106 of transistor 102 drop sufficiently, with respect to the reference bias voltage on base 103 of transistor 102 as established by the voltage drop across resistor 218 to provide the necessary base-emitter voltage on transistor 102.

The operation of control circuits 100 and 200 described above may be altered to compensate for manufacturing tolerances of the components or to trim the speed of motor 10 to precisely the desired level by means of rheostats 116 and 216. A capacitor, such as capacitor 130 shown in FIG. 4, may be connected in parallel with the emitter-collector circuit of transistor 102 and motor 10 to suppress radio frequency interference.

Figure 10:
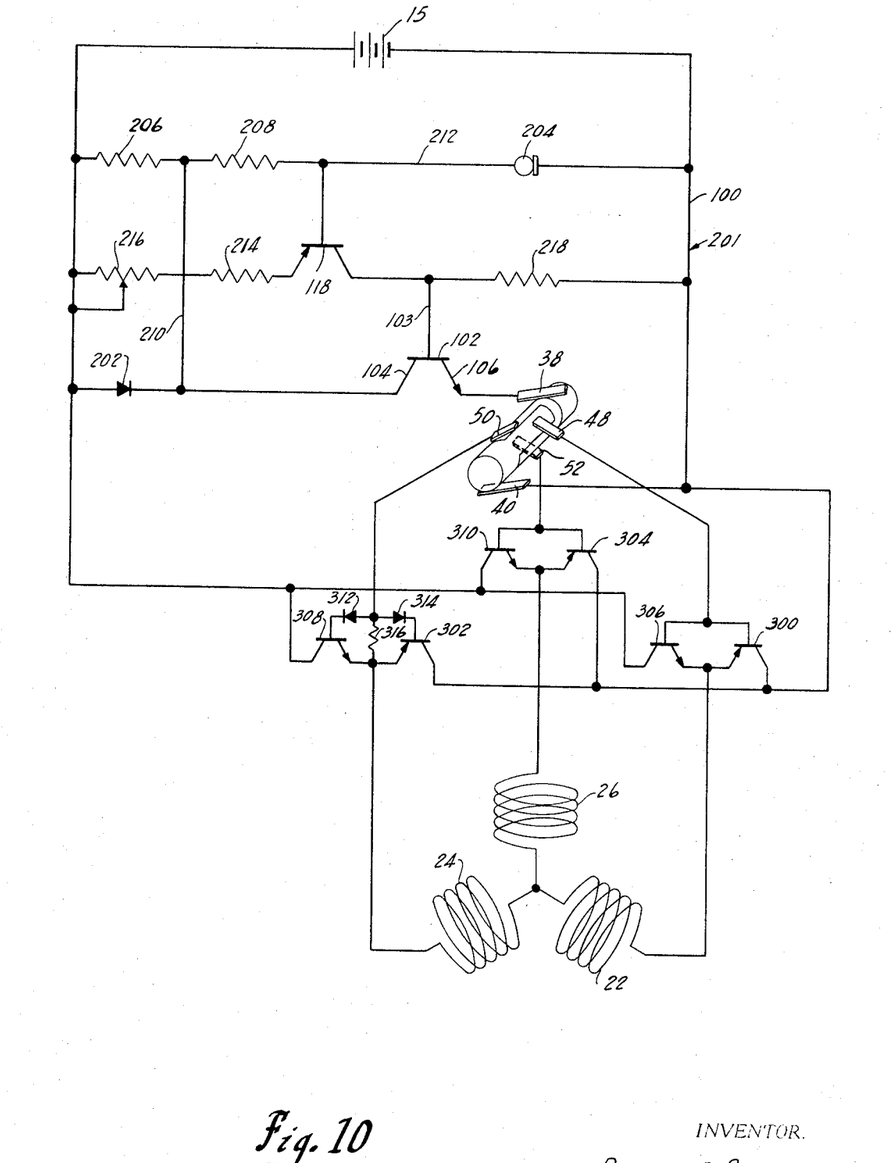
FIG. 10 is a schematic diagram of still another embodiment of the control circuit of the present invention, which embodiment decreases the power passing through the control circuit while maintaining constant speed operation of the motor.

In some applications it may be desirable to reduce the power passing through control circuit 100. In such cases, the commutator brush apparatus may be utilized to drive pairs of complementary, amplification transistors which in turn actually energize the windings, as shown in FIG. 10. FIG. 10 shows, for illustrative purposes, a load and voltage insensitive control circuit 201 of a type similar to that shown in FIG. 5 and similar elements are identified by identical numerals in both figures. FIG. 10 also shows a power control and amplification means comprised of three pairs of complementary transistors connected in parallel and interposed between brushes 48, 50 and 52 and windings 22, 24 and 26. One transistor of each pair, for example, transistors 300, 302 and 304, is of the PNP type while the other transistor of each pair, for example, transistors 306, 308 and 310, is of the NPN type.

The emitters of each transistor pair are connected together and the collectors of each transistor pair are connected to battery 15. Specifically, the collectors of transistors 300, 302 and 304 are connected to the negative terminal of battery 15, while the collectors of transistors 306, 308 and 310 are connected to the positive terminal of battery 15. The common junction of the emitters of transistors 300 and 306 is connected to winding 22, the common junction of the emitter of transistors 302 and 308 is connected to winding 24, and the common junction of the emitters of transistors 304 and 310 is connected to winding 26. The base terminals of transistors 300 and 306 are connected in parallel to brush 48, the base terminals of transistors 302 and 308 are connected in parallel to brush 50 and the base terminals of transistors 304 and 310 are connected in parallel to brush 52.

The operation of control circuit 201 is analogous to that of control circuit 200 described above. However, the energization supplied to brushes 48, 50 and 52 is supplied to the base terminals of selected ones of the pairs of transistors rather than directly to the motor windings. The brush energization places the transistors in the conductive state, thereby to supply power from battery 15 to windings 22, 24 and 26. For example, assume transistor 102 is rendered conductive when brush 48 is in contact with negative segment 44 and brush 50 is in contact with positive segment 42, as shown in FIG. 3a. The positive potential of brush 50, when applied to the base terminal of transistor 308, turns that transistor on, connecting the positive terminal of battery 15 to winding 24. Similarly, the negative potential applied to the base of transistor 300 by brush 48, turns that transistor on connecting winding 22 to the negative terminal of battery 15. The stator windings of motor 10 are thus energized in the manner shown in FIG. 3b. However, because of the imposition of transistors 308 and 300 between battery 15 and the stator windings, a reduced current may be commutated by brushes 48 and 50. Because of this low current and the completely resistive nature of the base circuit of the complementary pairs of transistors, arcing and other deletrious phenomena are reduced providing almost infinite life to the commutating apparatus of motor 10. In the alternative, a greater current may be supplied to windings 22 and 24 to increase the output torque of motor 10 with no increase in brush current.

If transistor 102 is rendered conductive when brush 48 is in contact with negative segment 44 and brush 52 is in contact with positive segment 42, as shown in FIG. 3c, the positive potential on brush 52, when applied to the base terminal of transistor 310 turns that transistor on, connecting the positive terminal of battery 15 to winding 26. The energization of winding 22 remains the same so that the energization of the stator winding of motor 10 is as shown in FIG. 3d. Brush 50 is located on insulating portion 46, deenergizing the brush and turning off transistor 308.

The complementary pairs of transistors are arranged to both provide power to the motor windings and to apply the self-generated and counter e.m.f. developed in the motor to control circuit 201.

It has been found advantageous to utilize germanium transistors for transistors 300 through 310 because of the emitter-base reverse voltage characteristics thereof. If other types of transistors, such as silicon transistors are utilized, protective means such as diodes 312 and 314 and resistor 316, shown in connection with transistors 302 and 308, may be employed to provide reverse voltage protection to the emitter-base junction of the transistors.

The above described operation continues as commutator 20 rotates. A positive potential on a given brush turns on NPN transistor of the complementary pair of transistors connected to the brush to connect the positive terminal of battery 15 to the associated stator winding, while the negative potential on the brush turns on the PNP transistor of the complementary pair to connect the negative terminal of battery 15 to the associated stator winding.

From the foregoing, it will be appreciated that there has been provided an improved control circuit which regulates the speed of the motor so as to make that speed independent of both applied load and voltage. The control circuit is economical, simple in design and construction, and highly accurate and responsive in its speed governing operation.

Various modes of carrying out the invention are contemplated as being within the scope of the following claims particularly pointing out and distinctly claiming the subject matter which is regarded as the invention.

I claim:

1. A control circuit for regulating the rotary speed of a direct current electric motor, said motor having windings for producing a magnetic field relatively rotating with respect to said windings and a member producing a second magnetic field for interaction with said relatively rotating magnetic field to provide mechanical rotation to said member or windings, said control circuit effecting such regulation by intermittent, repetitive power applications to the motor windings, said control circuit being insertable between a direct current power source and the motor windings and subjectable to the pulsating self-generated and counter e.m.f. generated in the windings responsive to the mechanical rotation occurring in the motor, said self-generated and counter e.m.f. being proportional in magnitude to the rotary speed of the member or windings, said control circuit comprising:

a first current control device having a power circuit connectable between the power source and the motor windings, said power circuit having a normally nonconductive state and a current conductive state, said current control device also having a differential voltage sensing circuit responsive to the self-generated e.m.f. of the windings and a reference bias voltage having a first discrete level of voltage and a second discrete level of greater voltage, said sensing circuit intermittently placing the power circuit in the conductive state to provide speed regulating applications of power to the windings from the power source; and a reference bias circuit comprising; a second current control device having a signal responsive input circuit and output circuitry connected to said sensing circuit of said first current control device for providing the first and second reference bias voltage levels thereto; a resistor interposed in series between the power source and the power circuit of said first current control device; a signal circuit coupled to the input circuit of said second current control device and having one end connectable to the power source and the other end connected to said resistor for completing a connection across the power source; said resistor having a current responsive voltage limiting means connected in parallel therewith, whereby said signal circuit energizes said second current control device to produce said first reference bias voltage level when said first current control device is in the nonconductive state, said first current control device power circuit being placed in the current conductive state whenever said sensing circuit is subjected to a predetermined voltage difference between the self-generated e.m.f. of the unpowered motor windings and the first reference bias voltage level, said signal circuit altering the energization of said second current control device responsive to current flow through the series resistor by an amount determined by said voltage limiting means to provide said second discrete level of reference bias voltage, said signal circuit returning the reference bias voltage to the first level of removing the power circuit of the first current control device from the current conductive state responsive to the decreases in the resistor current resulting from the counter e.m.f. produced by speed regulation.

2. The control circuit of claim 1 wherein said current responsive voltage limiting means comprises a diode means of predetermined breakover voltage characteristics.

3. The control circuit of claim 1 wherein said first current control device comprises a transistor having an emitter-collector power circuit connectable in series with the power source and the motor windings and a base-emitter sensing circuit connected to said reference bias circuit.

4. The control circuit of claim 1 wherein said signal circuit for said reference bias circuit includes means for rendering the energization provided to said second current control device insensitive to variations in the voltage of the power source.

5. The control circuit of claim 4 wherein said voltage insensitive means comprises a field effect diode.

6. In combination, a direct current electric motor and a control circuit for regulating the speed of the motor from a direct current power source:

said motor having;

windings for producing a magnetic field relatively rotating with respect to said windings when powered from said power source;

a member producing a second magnetic field for interaction with said relatively rotating magnetic field for providing mechanical rotation to said member or windings;

said windings providing a self-generated e.m.f. responsive to the mechanical rotation occurring in the motor when said windings are unpowered and a counter e.m.f. responsive to the mechanical rotation occurring in the motor when said windings are powered, said self-generated and counter e.m.f. being proportional in magnitude to the rotary speed of the member or winding;

said control circuit regulating motor speed by intermittent repetitive application of power to the motor windings from the power source and comprising;

a first current control device having a power circuit connectable to the power source and connected to the motor windings, said power circuit having a normally nonconductive state and a current conductive state, said current control device also having a differential voltage sensing circuit responsive to the self-generated e.m.f. of the windings and a reference bias voltage having a first discrete level of voltage and a second discrete level of greater voltage, said sensing circuit intermittently placing the power circuit in the conductive state to provide speed regulating applications of power to the windings from the power source; and a reference bias circuit comprising; a second current control device having a signal responsive input circuit and output circuitry connected to said sensing circuit of said first current control device for providing the first and second reference bias voltage levels thereto; a resistor interposed in series between the power source and the power circuit of said first current control device; a signal circuit coupled to the input circuit of said second current control device and having one end connectable to the power source and the other end connected to said resistor for completing a connection across the power source; said resistor having a current responsive voltage limiting means connected in parallel therewith, whereby said signal circuit energizes said second current control device to produce said first reference bias voltage level when said first current control device is in the nonconductive state, said first current control device power circuit being placed in the current conductive state whenever said sensing circuit is subjected to a predetermined voltage difference between the self-generated e.m.f. of the unpowered motor windings and the first reference bias voltage level, said signal circuit altering the energization of said second current control device responsive to current flow through the series resistor by an amount determined by said voltage limiting means to provide said second discrete level of reference bias voltage, said signal circuit returning the reference bias voltage to the first level for removing the power circuit of the first current control device for the current conductive state responsive to the decreases in the resistor current resulting from the counter e.m.f. produced by speed regulation.

7. The control circuit of claim 6 wherein said current responsive voltage limiting means comprises a diode means of predetermined breakover voltage characteristics.

8. The control circuit of claim 6 wherein said first current control device comprises a transistor having an emitter-collector power circuit connectable in series with the power source and connected to the motor windings and a base emitter sensing circuit connected to said reference bias circuit.

9. The control circuit of claim 6 wherein said signal circuit for said reference bias circuit includes means for rendering the energization provided to said second current control device insensitive to variations in the voltage of the power source.

10. A method of regulating the speed of a direct current motor capable of providing a self-generated and counter e.m.f., said speed regulation being obtained by intermittently, repetitively energizing the motor winding from a power source, said method comprising the steps of:
  sensing the self-generated e.m.f. appearing in the motor windings from the mechanical rotation occurring in the motor when the windings are unpowered;
  establishing a first discrete reference bias voltage level;
  comparing the self-generated e.m.f. to the reference bias voltage for providing current to the motor windings from the power source when the self-generated e.m.f. reaches a predetermined voltage with respect to the reference bias voltage;
  abruptly altering the reference bias voltage to a second discrete level responsive to current flow through the motor windings for providing a speed restoring voltage to the motor;
  sensing the alteration in motor current caused by the speed responsive counter e.m.f. appearing in the motor windings for the mechanical rotation occurring in the motor when the windings are powered; and
  removing the voltage from the motor windings upon sensing the altered current corresponding to regulated motor speed.

11. The method of claim 10 further defined as establishing the reference bias voltage from the voltage of the power source and including the step of stabilizing the reference bias voltage against variations in the voltage of the power source.

12. The method of claim 10 further defined as including the step of limiting the amount by which the reference bias voltage is altered.

13. The method of claim 10 further defined as repeating the steps of the method to provide additional speed regulating power pulses from the power source to the motor windings.

14. In combination, a direct current motor and a control circuit for regulating the speed of the motor from a direct current power source;
  said motor having;
  windings for producing a magnetic field relatively rotating with respect to the windings when powered from the direct current power source; and
  a member producing a second magnetic field for interaction with said relatively rotating magnetic field for providing mechanical rotation to said member or windings;
  said windings providing a self-generated e.m.f. responsive to the mechanical rotation occurring in the motor responsive to the mechanical rotation occurring in the motor when said windings are unpowered and a counter e.m.f. responsive to the mechanical rotation occurring in the motor when said windings are powered, said self-generated and counter e.m.f. being proportional in magnitude to the rotary speed of the member or winding;
  power control means interposed between said motor windings and the direct current power source for powering said windings to produce the relatively rotating magnetic field, said power control means being operable by said control circuit;
  said control circuit regulating motor speed by intermittent, repetitive, operation of the power control means and application of power to the motor windings from the direct current power source comprising;
  a first current control device having a power circuit connectable to the power source and connected to the power control means, said power circuit having a normally nonconductive state and a current conductive state, said current control device also having a differential voltage sensing circuit responsive to the self-generated e.m.f. of the windings and a reference bias voltage having a first discrete level of voltage and a second discrete level of greater voltage, said sensing circuit intermittently placing the power circuit in the conductive state for operating the power control means to provide speed regulating applications of power to the windings; and
  a reference bias circuit comprising; a second current control device having a signal responsive input circuit and output circuitry connected to said sensing circuit of said firt current control device for providing the first and second reference bias voltage levels thereto; a resistor interposed in series between the power source and the power circuit of said series between the power source and the power circuit of said first current control device; a signal circuit coupled to the input circuit of said second current contol device and having one end connectable to the power source and the other end connected to said resistor for completing a connection across the power source; said resistor having a current responsive voltage limiting means connected in parallel therewith,
  whereby said signal circuit energizes said second current control device to produce said first reference bias voltage level when said first current control device is in the nonconductive state, said first current control device power circuit being placed in the current conductive state whenever said sensing circuit is subjected to a predetermined voltage difference between the self-generated e.m.f. of the unpowered motor windings and the first reference bias voltage level, said signal circuit altering the energization of said second current control device responsive to current flow through the series resistor by an amount determined by said voltage limiting means to provide said second discrete level of reference bias voltage, said signal circuit returning the reference biase voltage to the first level for removing the power circuit of the first current control device from the current conductive state responsive to the decreases in the resistor current resulting from the counter e.m.f. produced by speed regulation.

15. The combination of claim 14 wherein the power control means includes at least one pair of complementary transistors connected in parallel between said control circuit and said motor windings, said transistors having power crcuits connected between the direct current power source and said motor windings and a regulating circuit connected to the power circuit of said current control device.

16. The combination of claim 15 wherein said pair of complementary transistors includes ones transistor of the NPN type and a second transistor of the PNP type.

17. The combination of claim 16 wherein said transistors are germanium transistors.

* * * * *